United States Patent [19]

Hashimoto et al.

[11] 4,340,779

[45] Jul. 20, 1982

[54] INTERPRETER INTERCOMMUNICATION AND PUBLIC ADDRESS SYSTEM

[75] Inventors: Hideaki Hashimoto, Tokyo; Mitsuo Abe, Yokohama; Masaharu Morita, Kawasaki, all of Japan

[73] Assignee: Prince Hotels, Inc., Japan

[21] Appl. No.: 112,449

[22] Filed: Jan. 16, 1980

Related U.S. Application Data

[63] Continuation of Ser. No. 885,350, Mar. 13, 1978.

[30] Foreign Application Priority Data

May 24, 1977 [JP] Japan .............................. 52-060218

[51] Int. Cl.³ .............................................. H04B 5/00
[52] U.S. Cl. .................................................. 179/1 B
[58] Field of Search .................. 179/1 B, 1 A, 1 SW; 35/35 C; 340/148; 434/156

[56] References Cited

U.S. PATENT DOCUMENTS

3,720,788  3/1973  Hashimoto ........................ 179/1 B
3,809,812  5/1974  Smith .................................. 179/1 B Primary Examiner—Mark E. Nusbaum
Assistant Examiner—E. S. Kemeny
Attorney, Agent, or Firm—Connolly & Hutz

[57] ABSTRACT

Simultaneous interpretation apparatus using matrix circuits whereby, even when an additional original language is used other than the specified original languages for the apparatus, simultaneous interpretation of that additional original language into the specified original languages is accomplished with ease and without hindrance. The present invention is particularly adapted to the interpretation of four specified original languages, for example Japanese, English, French and Spanish, and is particularly useful when an additional original language is used, such as Chinese for example. The matrix circuitry of the present invention enables translation of the additional original language to proceed even though the apparatus is primarily adapted for use in interpreting and translating the four specified original languages. Without this matrix circuitry the apparatus could not adapt to the additional original language since certain translators would not be alerted to perform their translating duties.

1 Claim, 2 Drawing Figures

INTERPRETER INTERCOMMUNICATION AND PUBLIC ADDRESS SYSTEM

CROSS-REFERENCE TO RELATED APPLICATION

This application is a continuation of application Ser. No. 885,350 filed Mar. 13, 1978.

BACKGROUND OF THE INVENTION

This invention relates to simultaneous interpretation apparatus for use in an assembly hall, for example, for simultaneously interpreting the original language of the speaker into plural languages through interpreters.

In the interpretation system using the most common conventional simultaneous interpretation apparatus, direct interpretation becomes difficult when a language is used other than the several specified original languages of the conference. On such an occasion the additional original language must first be interpreted into one of the several specified languages, and than translated from that language into the remaining specified original languages of the conference. This procedure is difficult and time-consuming and necessitates changing operation of wirings of the apparatus each time the additional language is interpreted. In other words, the conventional simultaneous interpretation apparatus is an inconvenient system and hinders the smooth simultaneous interpretation when an original language other than the specified original languages for the apparatus is additionally used.

In order to solve the above-mentioned problem, one of the inventors herein previously filed a patent application covering a simultaneous interpretation apparatus using a diode matrix circuit which is conveniently used even in the international conference using a medium language. This prior invention of one of the inventors was granted as Japanese Pat. No. 786,920, published for opposition on Jan. 7, 1975 and corresponding to U.S. Pat. No. 3,720,788, granted Mar. 13, 1973.

The simultaneous interpretation apparatus of Japanese Pat. No. 786,920 comprises a first transmission circuit for transmitting the audio signal of a microphone for a speaker (a participant making a speech in one of the specified original languages) through a transmitter, a first booth for translating the audio signal of the speaker into a medium language and transmitting the audio signal of the medium language, a second booth for translating the audio signal of the medium language and transmitting the audio signal of each of the specified original languages except the language of the speaker, a first diode matrix consisting of transverse lines connected, respectively, to a power source via switches and longitudinal lines to be connected and disconnected to the transverse lines via detachable diode-pins, first selectors for turning on and off the output of the first and second booths by means of the output of the longitudinal lines of the diode matrix, second selectors for selectively switching the audio signal translated by the first booth and that of the second booth by means of the output of the transverse lines of the diode matrix, and a second transmission circuit for transmitting the audio signal selected by the second selectors through a transmitter.

In the above-mentioned apparatus, diode pins in the number corresponding to the number of specified original languages and the interpretation system are detachably inserted or removed to and from the crossing junction points of the transverse lines and the longitudinal lines so as to change the direction of flow of a current from the transverse lines to the longitudinal lines. At the same time the apparatus controls all the circuits and performs the interpretation instruction display for all interpretation booths by operation of a control switch. This procedure has not been feasible with the heretofore known interpretation apparatus.

When the specified original languages to be used are four languages, for example, the apparatus of the above-mentioned Japanese Pat. No. 786,920 can be adapted to only the four languages during the conference. Namely, when a certain additional original language other than the four specified original languages is used as an original language during the conference, for example, the additional original language is fed to the transmitter so that the interpretation into any one of the four specified original languages becomes impossible. In other words, the simultaneous interpretation into the four specified original languages becomes impossible, and the additional original language must be translated, word by word into the four languages, thus hindering the smooth progress of the conference.

The simultaneous interpretation apparatus of the present invention is characterized by a construction which eliminates the above-mentioned problems and enables the easy translation and the smooth progress of the conference even when an additional original language other than the specified original languages for the apparatus is used as an original language.

SUMMARY OF THE INVENTION

The first object of the present invention is to provide a simultaneous interpretation apparatus which, even when a original language other than one of the specified original languages for the apparatus is additionally used, enables simultaneous translation of the language into the specified original languages without stopping the intertranslation of the specified original languages, by the use of matrix circuits.

The second object of the present invention is to provide a simultaneous interpretation apparatus of which matrix circuits include a first diode matrix consisting of transverse lines connected to a power source via switches, respectively, and longitudinal lines to be connected and disconnected to the transverse lines via switch means and a second diode matrix consisting of transverse lines connected to the power source via an original-removing switch and longitudinal lines to be connected and disconnected to the transverse lines via switch means and connected to the longitudinal lines of the first diode matrix, and which, when an additional original language other than the specified original languages for the conference is used as an original language during the conference, enables the easy translation of the additional original language into the specified original languages.

The above described matrix circuitry of the present invention enables translation of an additional original language such as Chinese, for example, even though the apparatus is primarily adapted for use in interpreting and translating specified original languages that do not include Chinese.

BRIEF DESCRIPTION OF THE DRAWINGS

The above and other objects of the present invention will become more apparent to those skilled in the art from a reading of the following detailed description of a preferred embodiment of the invention when read in conjunction with the accompanying drawings, in which.

DETAILED DESCRIPTION OF THE INVENTION

Figure 1:
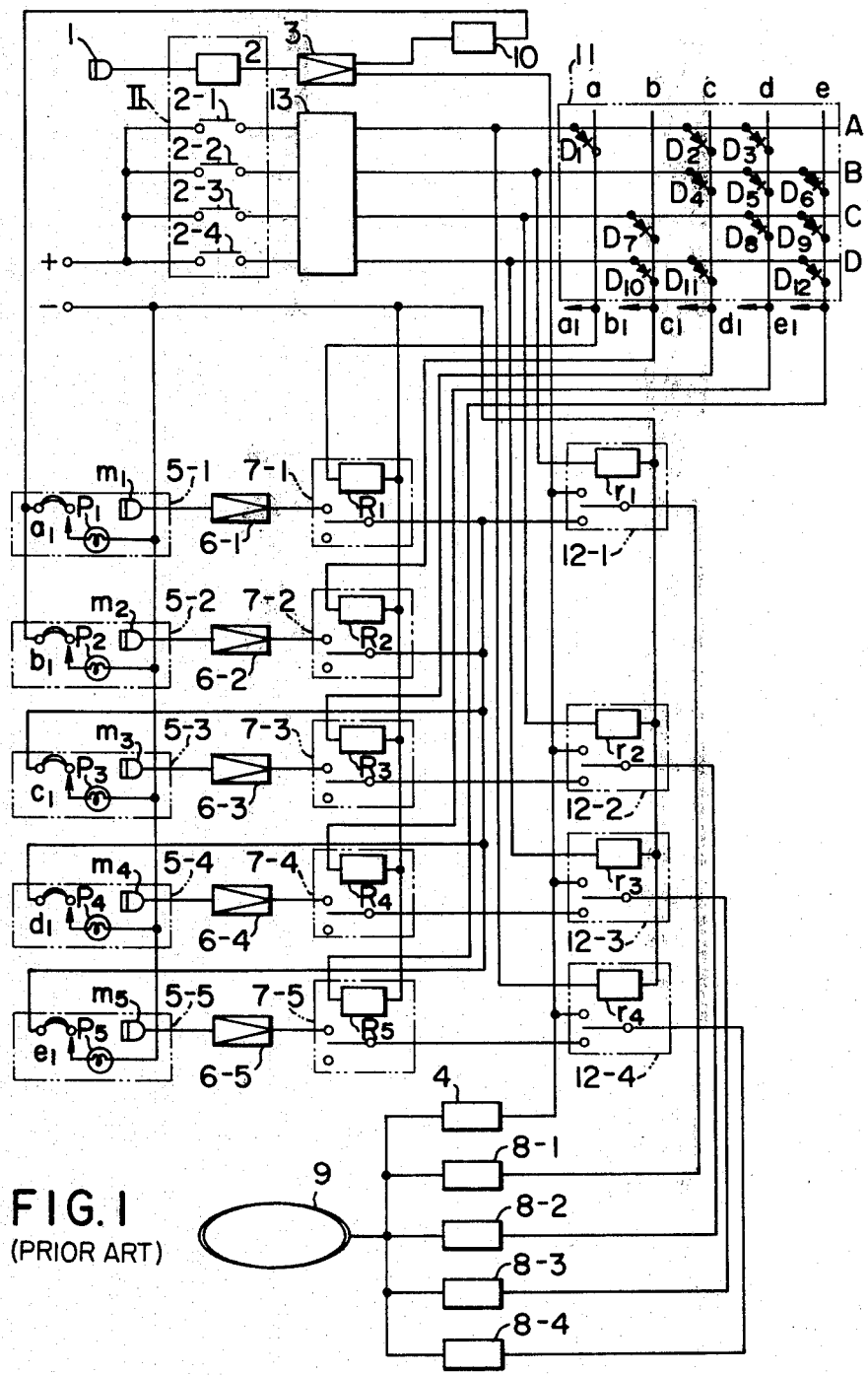
FIG. 1 is a wiring diagram of a conventional simultaneous interpretation apparatus.

In the following description, the apparatus described is for the simultaneous interpretation of four specified original languages by way of example. It should be understood however that the apparatus of the invention is not of course restricted to four specified original languages.

The speech of a participant in an assembly hall is converted into an audio signal by a microphone 1 exclusively for the speaker and transmitted to the assembly hall by a first transmission circuit having a transmitter 4. In other words, the audio signal from the microphone 1 is fed to the control switch means 2 of a mixing room II, selected and fed to an amplifier 3 where the original language of the speaker is amplified, adjusted to a proper level, transmitted from the transmitter 4 exclusively for the original to the assembly hall through a loop antenna 9.

The audio signal of the speaker is further transmitted through a monitor amplifier 10 connected to the above-mentioned amplifier 3 to first booths 5-1, 5-2. Interpreters positioned at these booths 5-1, 5-2 listen to the specified original language of the speaker using an earphone. The interpreters at these first booths 5-1, 5-2 alternately make the interpretation as the specified original language being spoken changes from one to another, and the interpreted languages are transmitted to earphones of selectors positioned at second booths 5-3, 5-4, 5-5 whereby interpreters at these booths make the interpretation into the other of the specified original languages of the conference.

Switches 2-1, 2-2, 2-3, 2-4 are provided at the mixing room II and a holding-releasing circuit 13 is interposed between transverse lines A, B, C, D and these switches 2-1, 2-2, 2-3, 2-4 so that when the switches 2-1, 2-2, 2-3, 2-4 are kept on or off, the circuit 13 impresses or cuts off the voltage at each of the transverse lines A, B, C, D of a diode matrix circuit 11 (first diode matrix). When one of the switches 2-1 to 2-4 connected to the transverse lines A, B, C and D, respectively, through the circuit 13 is turned on, the circuit 13 functions to keep the transverse line connected to the switch which is turned on. The lines A, B, C, D of this matrix circuit 11 are assigned to the four specified original languages, for example Japanese, English, French and Spanish, respectively, and relays $R_1$, $R_2$, $R_3$, $R_4$, $R_5$ are connected to longitudinal lines a, b, c, d, e that cross these transverse lines A, B, C, D. Interpretation instruction display lamps $P_1$, $P_2$, $P_3$, $P_4$, $P_5$ disposed to the booths 5-1, 5-2, 5-3, 5-4, 5-5 of the first and second booths are connected to $a_1$—$a_1$, $b_1$—$b_1$, $c_1$—$c_1$, $d_1$—$d_1$, $e_1$—$e_1$ from the lines a, b, c, d, e. When actuated, these relays $R_1$, $R_2$, $R_3$, $R_4$, $R_5$ turn on first selectors 7-1, 7-2, 7-3, 7-4, 7-5 connected to microphones $m_1$, $m_2$, $m_3$, $m_4$, $m_5$ of the booths 5-1, 5-2, 5-3, 5-4, 5-5 via amplifiers 6-1, 6-2, 6-3, 6-4, 6-5, respectively, and become conductive to the booths 5-1, 5-2, 5-3, 5-4, 5-5, respectively. The symbols "+" and "−" designate power source terminals of the present apparatus.

In order to light any of the interpretation instruction display lamps $P_1$, $P_2$, $P_3$, $P_4$, $P_5$ of the booth requiring the interpretation, diode pins are detachably plugged into the crossings of the transverse lines and the longitudinal lines of the above-mentioned matrix circuit 11 so that when the interpretation instruction lamps are lit, the interpreters positioned at the booths 5-1, 5-2, 5-3, 5-4, 5-5 start the interpretation. A switch means incorporating a diode therein may be used in place of the above-mentioned diode pin. The interpreted language is amplified by the amplifiers 6-1, 6-2, 6-3, 6-4, 6-5 through the microphones $m_1$, $m_2$, $m_3$, $m_4$, $m_5$ of the booths 5-1, 5-2, 5-3, 5-4, 5-5, and transmitted to the assembly hall by transmitters 8-1, 8-2, 8-3, 8-4 exclusively assigned to each of the four specified original languages via the second transmission circuit through the first selectors 7-1, 7-2, 7-3, 7-4, 7-5 in varying carrier frequencies from one another. In this instance, the interpreted language is applied as input to the transmitters 8-1, 8-2, 8-3, 8-4 through second selectors 12-1, 12-2, 12-3, 12-4 that become conductive when relays $r_1$, $r_2$, $r_3$, $r_4$, $r_5$ connected to the lines A, B, C, D of the matrix circuit 11 are actuated. Namely, the second selectors selectively switch the audio signal of the language interpreted at the first and second booths and the audio signal of the original language of the microphone 1 for the speaker.

Among the characteristics of the simultaneous interpretation apparatus of the present invention, the characteristics, that have so far been described are substantially the same as that of the simultaneous interpretation apparatus, shown in FIG. 1, of Japanese Pat. No. 786,920. In the apparatus consisting only of the above-described characteristics, however, the simultaneous interpretation into all of the Japanese, English, French and Spanish becomes impossible when Chinese, for example, as an additional original language is also used at the conference and passed through any one of the transmitters 8-1, 8-2, 8-3, 8-4, because any one of the four specified original languages of the conference must then be sacrificed.

Figure 2:
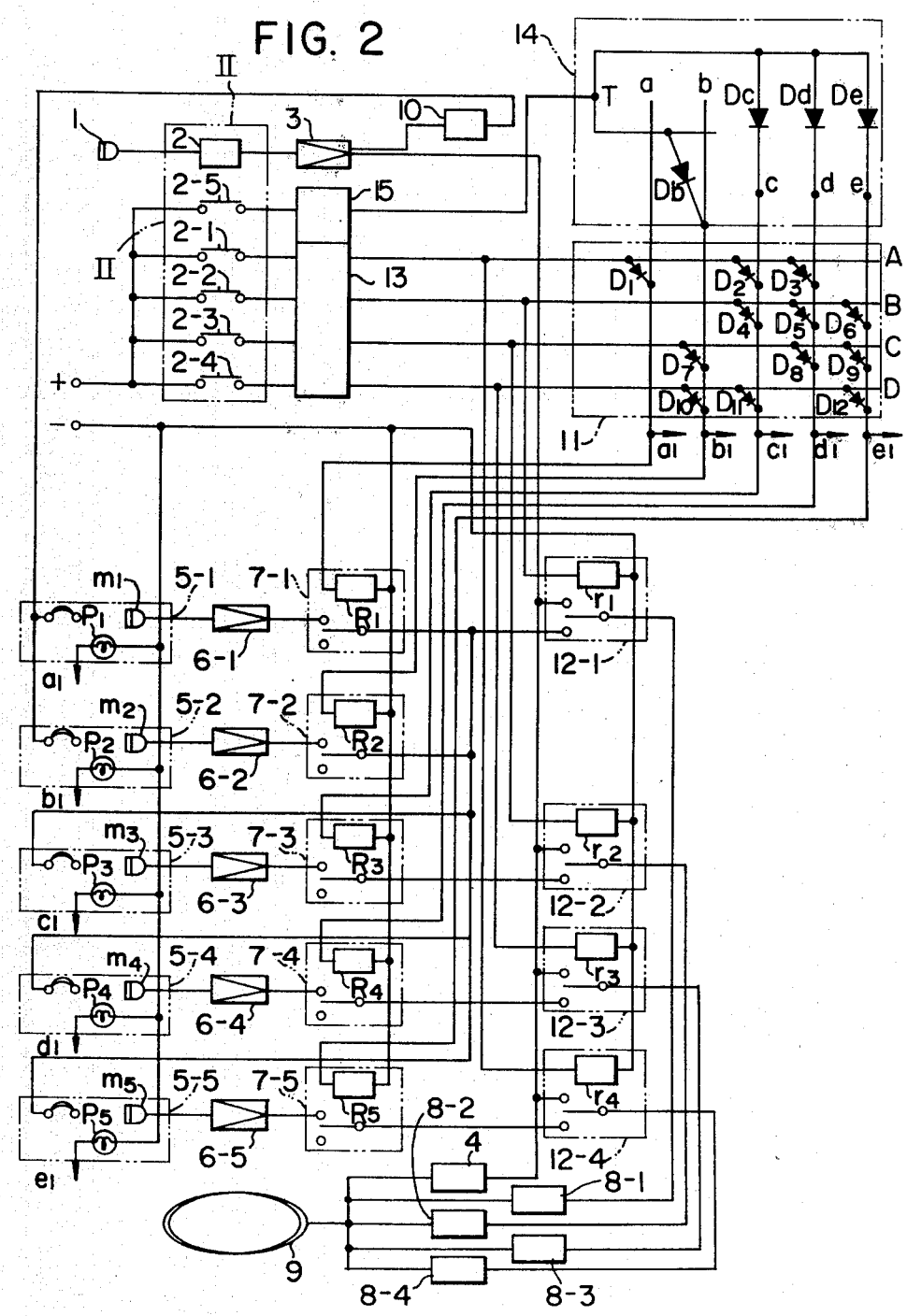
FIG. 2 is a wiring diagram of a simultaneous interpretation apparatus in accordance with the present invention.

In addition to the above-mentioned circuit, however, since the simultaneous interpretation apparatus in accordance with the present invention includes an effective combination of an original-removing matrix circuit 14 (second diode matrix), an original-removing switch 2-5 of the control switch means 2 and a holding-releasing circuit 15, as shown in FIG. 2 (then the simultaneous translation into the four specified original languages of Japanese, English, French and Spanish is possible even when Chinese is used as an additional original language.) The original-removing matrix circuit 14 comprises a diode matrix consisting of a transverse line T connected to the power source via the original-removing switch 2-5 and the holding-releasing circuit 15, and longitudinal lines a through e to be connected or disconnected to the transverse line T by a detachably insertible diode pin and connected to the longitudinal lines of the diode matrix 11.

The circuit is designed so that among the aforementioned first selectors, the selectors 7-1 and 7-2 (the first selectors) turn on and off the output of the first booths 5-1, 5-2 by means of the output from the diode matrix 14 or the longitudinal lines a, b (the first group 1 of the longitudinal lines) among the longitudinal lines of the diode matrix 11, while the selectors 7-3, 7-4 and 7-5 (the first group 2 of the selectors) turn on the output of the second booths 5-3, 5-4 and 5-5 by means of the output of the diode matrix 14 or the longitudinal lines c, d and e (the second group of the longitudinal lines) among the longitudinal lines of the diode matrix 11.

The mode of operation of the apparatus of the present invention will now be explained with reference to FIG. 2 whereby the official languages used in the assembly hall are four specified original languages, i.e., Japanese, English, French and Spanish, and Chinese as an additional original language is applied to the microphone 1, for the sake of explanation.

Chinese applied as an original language to the microphone 1 is first transmitted by the first transmission circuit. Namely, it is fed from the microphone 1 through the control switch means 2 to the amplifier 3, there amplified and adjusted, and then fed to the original transmitter 4 where it is transmitted into the assembly hall through the loop antenna 9. The audio signal of Chinese is sent to the first booths 5-1 and 5-2 through the monitor amplifier 10 that is connected to the amplifier 3. In this instance, the original-removing switch 2-5 of the mixing room II is turned on and the holding-releasing circuit 15 additionally incorporated is actuated so as to apply a voltage to the line T of the original-removing matrix circuit 14. Even when the original-removing switch 2-5 returns to the normal position, the line T of the original-removing matrix circuit 14 is self-maintained by the holding-releasing circuits 15 and 13 as it is impressed with the voltage. A voltage is also applied to the line b through a diode $D_b$ that is inserted at the crossing between the line b and the line T joined with the original-removing matrix circuit 14.

As the relay $R_2$ connected to this line b is energized, the interpretation instruction display lamp $P_2$ of the first booth 5-2 is lit. When observing this lamp $P_2$ lighting, the interpreter positioned at the booth 5-2 starts interpretation of Chinese into English as a medium language. The interpreted language (English) is amplified and adjusted to a proper level by the amplifier 6-2 through the microphone $m_2$ and fed to the second selector 12-1 through the first selector 7-2 which becomes conductive to the booth 5-2 by the actuation of the relay $R_2$.

Though the relay $r_1$ of this selector 12-1 is connected to the line B of the matrix circuit 11, it is rendered inoperative because no voltage is fed to the line B. Accordingly, the selector 12-1 is conductive with respect to the booth 5-2 whereby English is transmitted to the assembly hall through the transmitter 8-1 which is exclusively for English use. When Chinese is not used during the conference, the booth 5-1 is assigned as a booth for the interpretation of Japanese as one of the four specified original languages into English and the booth 5-2 is a booth assigned as a booth for the interpretation of French and Spanish as two of the other specified original languages into English.

When the additional original language Chinese is spoken, English interpreted from Chinese at the booth 5-2 is transmitted to the assembly hall whereby the interpretation at the booth 5-1 is not necessary. In other words, it is not necessary to plug the diode pin into the crossing of the line T of the original-removing matrix circuit 14 and the line a, and no voltage is fed to the line a. Hence, the relay $R_1$ is not actuated and the microphone $m_1$ connected to the booth 5-1 and the amplifier 6-1 are non-conductive with respect to the selector 12-1.

Also, since the interpretation instruction display lamp $P_1$ connected to the line a is not lit at the booth 5-1, it is obvious that no interpretation is necessary. The booth 5-3 is a booth assigned to the interpreter who interprets English into French. At this booth 5-3, a voltage is fed to the longitudinal line c through a diode $D_c$ interposed between the line T of the original-removing matrix circuit 14 and the longitudinal line c whereby the interpretation instruction display lamp $P_3$ connected to the line c is lit and the relay $R_3$ of the selector 7-3 is actuated. As the lamp $P_3$ is lit, the interpreter positioned at the booth 5-3 starts the interpretation.

Namely, the interpreter at the booth 5-3 listens to English translated from Chinese at the booth 5-2 through the earphone and interprets it into French. French thus interpreted is applied to the amplifier 6-3 through the microphone $m_3$, amplified and adjusted by the amplifier 6-3 and fed to the second selector 12-2 through the first selector 7-3 which is rendered conductive to the booth 5-3 by the actuation of the aforementioned relay $R_3$. The relay $R_2$ of this selector 12-2 is connected to the transverse line C of the matrix circuit 11 and rendered inoperative because no voltage is fed to the line C. Hence, the audio signal fed to the selector 12-2 is transmitted to the assembly hall through the transmitter 8-2 which is exclusively for French use.

The booth 5-4 is a booth at which the interpreter for the interpretation of English into Spanish is positioned. The connection circuit of this booth 5-4 is the same as that of the booth 5-3 and it operates in the same way as the booth 5-3. Namely, since the current flows in the direction of a diode $D_d$ connected to the line T of the original-removing matrix circuit 14 to which a voltage is fed and the longitudinal line d, and the interpretation instruction display lamp $P_4$ of the booth 5-4 is lit. As the display lamp $P_4$ is lit, the interpreter at this booth 5-4 interprets English from booth 5-2 into Spanish. Spanish thus interpreted is fed through the microphone $m_4$ to the amplifier 6-4, and its audio signal is transmitted to the assembly hall through the amplifier 6-4, the selector 7-4, the selector 12-3 and the transmitter 8-3 exclusively for Spanish use.

The booth 5-5 is for the interpreter who interprets English into Japanese. This booth has the same construction as the aforementioned booths 5-3 and 5-4 and also operates in the same manner. Namely, since a current flows in the direction of a diode $D_e$ interposed between the longitudinal line e and the line T of the original-removing matrix circuit 14, a voltage is fed to the line e whereby the interpretation instruction display lamp $P_5$ is lit. By observing the lighting of this lamp $P_5$, the interpreter starts the interpretation of English interpreted at the booth 5-2 into Japanese. Japanese thus interpreted is fed through the microphone $m_5$ to the amplifier 6-5 and its audio signal is transmitted to the assembly hall through the amplifier 6-5, the selectors 7-5 and 12-4 and the transmitter 8-4 which is exclusively for Japanese.

As mentioned above, when an additional original language such as Chinese is spoken, Chinese is set to the line T of the original-removing matrix circuit 14 whereby the lines A, B, C and D are assigned, respectively, to Japanese, English, French and Spanish as the four specified original languages. When the spoken language is changed to English, for example, the switch 2-2 of the mixing room II is turned on so as to feed a voltage to the line B of the matrix circuit 11. Into the crossings of the lines c, d, e with the line B are inserted, respectively, the diodes $D_4$, $D_5$, $D_6$ whereby the interpretation of French, Spanish and Japanese becomes necessary at the booths 5-3, 5-4 and 5-5.

When the spoken language is changed to French and Spanish, respectively, the switches 2-3, 2-4 of the mixing room II are turned on so as to feed a voltage to the lines C, D of the matrix circuit 11 whereby the longitudinal lines b, c, d, e crossing the lines C, D are fed with the voltage which causes the same operation as above.

As described in the foregoing paragraphs, the languages interpreted from the specified original language are transmitted by the transmitters assigned to each language in varying carrier frequencies from one another to the assembly hall so that participants of the conference tune their receiver to the frequency of the desired language and listen to and easily understand the speech made in a foreign language through their mother tongue. Even when an additional original language other than the specified original languages of the conference is additionally used, the simultaneous interpretation can be smoothly made by inserting or removing the diode pin to and from the original-removing matrix 14 that is added to the matrix of the prior patent granted to one of the inventors of the present invention. Hence, it is possible in accordance with the present invention to eliminate the interpretation word by word and at the same time, shorten the conference time.

What is claimed is:

1. In a communication system comprising a primary circuit for transmitting an audio signal from a speaker microphone to an audience through transmitter means, first booth means, means connecting the speaker microphone signal to the first booth means where the audio signal of the speaker is translated into a medium language, second booth means, means connecting the translated medium language to the second booth means where the medium language is translated into final languages, a plurality of secondary circuits connected to the first and second booth means, each circuit having transmitter means for transmitting to the audience an audio signal exclusively used for a translated language, a first diode matrix having a plurality of transverse lines connected to a power source via holding-releasing circuit means and switch means, and obverse lines connected to interpretation display lamps in the first and second booth means, each of the obverse lines being connected to a first selector with one selector associated with each of the booth means and its respective secondary circuit, diode pins arranged to connect and disconnect selected transverse lines with selected obverse lines for alerting translators in the first and second booth means and for energizing certain first selectors so as to transmit translated languages to the audience through certain secondary circuits, the first selectors serving to connect and disconnect between booth amplifiers, one associated with each booth means, and second selectors, the second selectors serving to connect and disconnect between the first selectors and the transmitter means of the secondary circuits, the improvement comprising a second diode matrix having second transverse lines connected to the power source via a second holding-releasing circuit and second switch means, and second obverse lines each connected to one of the obverse lines of the first diode matrix, second diode pins arranged to connect and disconnect the second transverse lines with selected second obverse lines so that the interpretation display lamps in one of the first booth means and in each of the second booth means are energized together with the secondary circuits associated with these booth means whereby even when an additional language is spoken other than the specified languages translation of the additional language is accomplished without interrupting translation of the specified languages.

* * * * *